March 14, 1950 — C. T. SANDS, JR — 2,500,577

SPINNING DEVICE FOR AIRPLANE LANDING WHEELS

Filed June 27, 1947

*INVENTOR.*
CHARLES T. SANDS JR.
By Howard J. Whelan

Patented Mar. 14, 1950

2,500,577

UNITED STATES PATENT OFFICE 2,500,577

SPINNING DEVICE FOR AIRPLANE LANDING WHEELS

Charles T. Sands, Jr., Baltimore, Md.

Application June 27, 1947, Serial No. 757,373

2 Claims. (Cl. 244—103)

This invention relates to vehicular wheels and more particularly to those usable on the landing gear of airplanes.

In a particular form of landing gear for airplanes, the pneumatic tired wheels thereon for landing purposes, are propelled or rotated at high speed before landing through mechanism within the airplane, in order to reduce the stresses incurred during landing on the runway. Without this rotation the rubber on the tires is apt to be torn off in large pieces during the landing, tending to cause irreparable damage to the tires and possible blowouts. This mechanism however is placed on the landing gear so as to engage the surface of the wheels or tires, so as to rotate them. The position of the mechanism is usually such that it is seriously affected by centrifugal force, shocks and other stresses. At a speed of 100 miles per hour and the shock of landing on the runway, the stress on the mechanism is so great that it usually cannot stand it, and in its break-up induces considerable injury to the airplane. Even though in some instances the mechanism is able to withstand the stresses several times, its eventual life is short.

It is therefore an object of the present invention to provide a new and improved wheel rotating mechanism for the wheels of an airplane landing gear that will avoid one or more of the disadvantages and limitations of the prior art.

Another object of this invention is to provide a new and improved wheel rotating mechanism for the landing gear of airplanes that will be self-contained and compact and so situated that it will not be subject to excessive centrifugal effects.

Another object of this invention is to provide a new and improved wheel rotating mechanism for the landing gear of airplanes that will have the driving mechanism enclosed within its axle.

Other objects will become apparent as the invention is more fully set forth.

For a better understanding of the invention and the objects thereof reference is made to the appended drawings. In conjunction with these drawings, the following description illustrates the features and principles of the invention. This particular form is used to present an example of the invention and not to limit it thereto, while the claims emphasize the scope of the invention.

In the drawings.

Similar reference characters refer to similar parts throughout the drawings.

Figure 1:
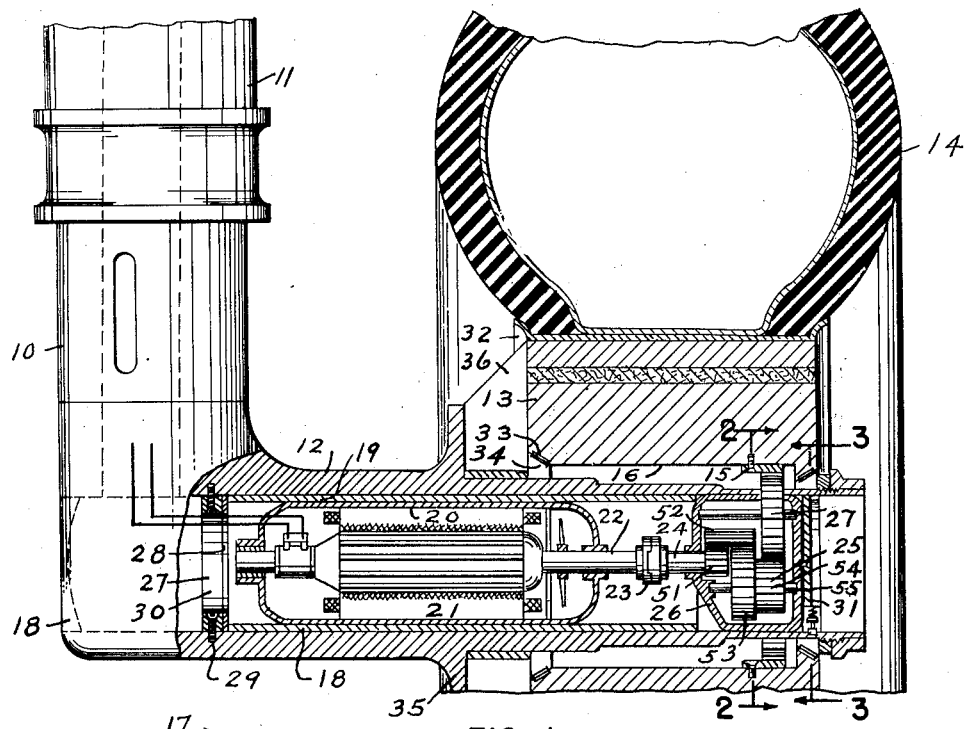
Figure 1 is an elevation of part of a landing gear embodying this invention, portions of the structure are broken away to show the interior construction.
Figure 2:
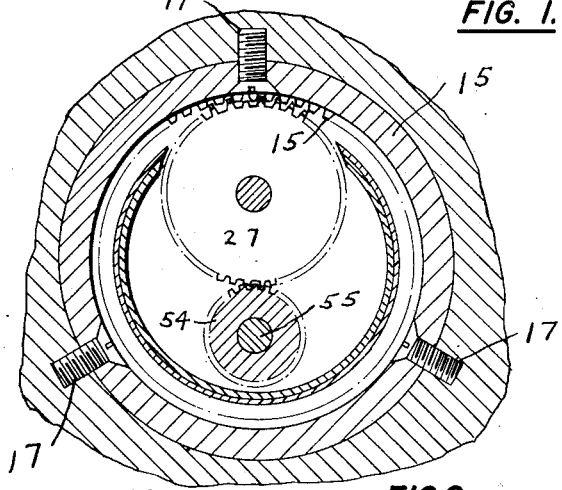
Figure 2 is a sectional view taken along line 2—2 of Figure 1.
Figure 3:
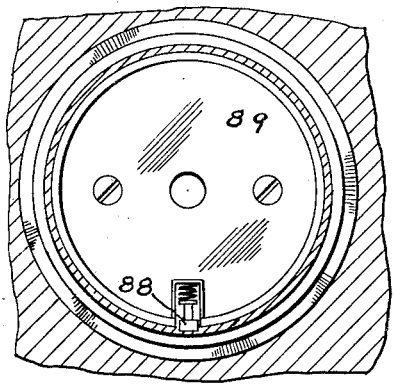
Figure 3 is a sectional view taken along the line 3—3 of Figure 1.

In the drawings, the particular form of the structure includes a part of a landing gear strut 10, such part being the lower leg that telescopes into the carriage casing 11 that proceeds to the airplane chassis, not shown. The strut 10 is hollow with a right angle offshoot bearing arm 12 projected towards the central portion or hub 13 of a pneumatic landing wheel 14. The offshoot arm 12 serves as a bearing for the hub 13, which can rotate freely thereon. The hub 13 is of conventional form, except in the particular that involves the use of an annular gear 15 on its internal hub-passage 16. The gear 15 is fastened in place by means of screws 17.

The hollow arm 12 has an inside chamber 18 to encase a cylindrical casing 19 which forms a rigidly held housing 20 for an electrical motor 21 that is assembled and positioned longitudinally therein. The motor 21 is of conventional design and has its shaft 22 extended into one end of a coupling 23. The opposite end of the coupling has a shaft 24 that extends into a gear reduction set 25 within a housing 26. The teeth of the last gear 27 of the set 25 engage with the teeth of the annular gear 15. The shaft 24 supports a gear 51 which rotates an idler gear 52, which transmits its rotation to gears 53 and 54 which are mounted on a shaft 55 positioned in the housing 26. The gear 54 rotates the gear 27 that drives the annular gear 15 and wheel 14. The shafts 22 and 24 are aligned with the axis of the bearing that supports the hub 13 of the wheel. The motor 21 is prevented from moving out of adjustment within the casing 19 by the plate 27 and gasket 28 which are held in place by the screws 29. This plate 27 is located at the brush end of the motor armature and has a central opening 30 to allow for ventilating and access thereto. The housing 26 is likewise retained in place by another plate 31 at the opposite end of the mechanism that operates the rotating gearing of the wheel 14.

Figure 4:
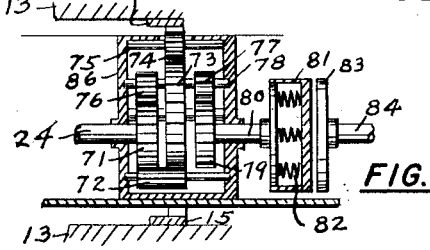
Figure 4 is an inside view with the housing in section of a modification of the mechanism used in this invention to induce the rotation of side by side wheels of a landing gear.

In the Figure 4 a clutch 81 is provided to transmit power to a second wheel and provide a plural arrangement of wheels when the weight of the plane requires it. In this modification shaft 24 supports a gear 71 through which an idler gear 72 is rotated and transmits rotation to an idler gear 73 that turns the gear 74 mounted on its shaft 75 which meshes with the annular gear 15 and rotates the wheel 14. Power is taken off the shaft 24 to drive a second wheel 14 in the following manner. The gear 71 drives idler gears 76 and 77 mounted on a shaft 78. The gear 77 is meshed with a gear 79 mounted on a shaft 80 and drives the clutch 81. The clutch is cushioned by springs 82. This unit is normally engaged with a clutch disc 83 attached to a shaft 84 which is connected and drives a second wheel 14. In extreme conditions the clutch functions as a slip coupling in case one of the wheels is required to revolve faster than the other. The housings 26 and 86 can be slipped in and out of the wheel assembly for repairs and interchange by releasing the locking means 88 attached to plate 89.

It is not deemed necessary to illustrate the details of such an arrangement as those skilled in the art can readily appreciate the manner in which such could be provided without specific explanation as to how it should be done.

The operation of the mechanism is accomplished through the use of a switch or connection either manually or automatically operated, when the airplane using the invention approaches a landing field. The mechanism speeds up the wheels until they are at a top predetermined speed so that by the time the landing gear wheels reach the ground they will be rotating sufficiently fast to cause the tires to hit the runway at about the same speed as the airplane is travelling. This eliminates any inertia or scuffing effects and thereby avoids any undue stresses on the rubber of the tires. This enables the tires and wheels to handle the landing effectively and smoothly. Since the motor and mechanism is axially located, it revolves around its own axis, instead of radially about it. The effect of centrifugal force or any jar or shock on landing is therefore relatively ineffective as compared with many arrangements, where the motor or mechanism is radially located. The chances of misplacement of these parts are therefore minimized. By having the unit within the axle structure arm keeps the device compact and out of the way, as well as offering no additional wind resistance. Also the motor and mechanism is effectively enclosed. The wheel rim 32 of the wheel 14 is mounted on a roller bearing arrangement 33 that reduces its friction and keeps it aligned and forms the hub of the wheel. An axle ring 34 keeps the wheel definitely positioned on the bearing arm. The flange 35 on this arm is surmounted by a cap 36 to keep the hub relatively free from dust.

Another feature of this invention is in the use of the electric motor indicated, not only for getting the tire and wheel up to speed, but also for its use as a generator if the latter should be rotated higher than normal, and thereby feed back into the electrical source of the airplane. This feeding back, serves to exert a braking effect, as well as make use of the excess energy of the plane that otherwise would be wasted. The connections to the motor run back to the electrical source in a conventional manner, and therefore are not completed in the drawings. It can be noted that the mechanism, motor reduction gear, etc., are so arranged that they can be readily reached for inspection, repair, replacement, oiling or other purpose, as access is provided at the end of the strut 10 where it is exposed beyond the hub of the wheel.

While but two general forms of the invention are shown in the drawings and described in the specifications it is not desired to limit this application for patent to this particular form, as it is appreciated that other forms could be made that would use the same principles and come within the scope of the appended claims.

Having thus described the invention, what is claimed is:

1. In combination with an airplane, a landing gear carriage structure with strut and bearing arm extending therefrom, with pneumatic wheels thereon, a starter wheel unit comprising a motor positioned in said arm, a mechanism for rotating the wheel from inside its hub, said motor and mechanism being aligned with the axis of said arm and with one another, coupling means for tying the mechanism with said motor, means for adjusting said motor and mechanism as a unit within said arm, means provided on the hub of said wheel for operational contact with said mechanism while the latter is rotating it, a casing for enclosing said motor and mechanism and emplacing it in the arm for operational functioning in rigid and predetermined relation therein, said mechanism and hub means consisting of annular and reduction gearing for adjusting the operation of said wheel as aforesaid said casing including separate housing for said mechanism to permit its adjustment and placement close but not integral therewith, said motor being electrically energized to permit it regenerating current from the rotative effect of the wheels thereon after starting and after being grounded and rotated by the airplane running on the ground and thereby offering resistance to the rotation of the wheels and absorb some of the moving energy of the airplane.

2. In combination with the landing gear structure of an airplane having strut and bearing arm, a wheel rotating unit, comprising in combination, an electric motor, a casing for holding said motor in predetermined position in the bearing arm between the strut and the hub of a wheel thereof, an annular gear mounted internally in the hub of the wheel of said structure, a reduction mechanism enclosed in said hub including a housing aligned with said casing and engaging said annular gear for operational actuation thereof, and means for facilitating the ventilation of said motor within the arm and providing access to the motor and mechanism, said motor being energized to rotate the wheel prior to landing of the airplane and to absorb energy from the wheel after landing, when the speed of the airplane equals that of the wheel.

CHARLES T. SANDS, Jr.

REFERENCES CITED

The following references are of record in the file of this patent:

UNITED STATES PATENTS

| Number | Name | Date |
|---|---|---|
| 1,313,537 | Jones | Aug. 19, 1919 |
| 2,285,436 | Hoover | June 9, 1942 |
| 2,298,523 | Webster | Oct. 13, 1942 |
| 2,414,859 | Demaline | Jan. 28, 1947 |
| 2,425,583 | Volk | Aug. 12, 1947 |